(12) United States Patent
Bremer

(10) Patent No.: US 10,131,214 B2
(45) Date of Patent: Nov. 20, 2018

(54) FIBERGLASS ROLLER FOR TARP DEPLOYING DEVICE

(71) Applicant: Sioux City Tarp, Inc., Sioux City, IA (US)

(72) Inventor: Donald William Bremer, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 23 days.

(21) Appl. No.: 14/920,875

(22) Filed: Oct. 23, 2015

(65) Prior Publication Data
US 2017/0113524 A1 Apr. 27, 2017
US 2017/0217292 A9 Aug. 3, 2017

Related U.S. Application Data

(60) Provisional application No. 62/067,432, filed on Oct. 22, 2014.

(51) Int. Cl.
| | | |
|---|---|---|
| B60J 7/08 | (2006.01) | |
| B65H 75/30 | (2006.01) | |
| B65H 75/10 | (2006.01) | |

(52) U.S. Cl.
CPC .............. B60J 7/085 (2013.01); B65H 75/10 (2013.01); B65H 75/30 (2013.01); *B65H 2701/1922* (2013.01); *B65H 2701/534* (2013.01)

(58) Field of Classification Search
CPC .......... B60J 7/085; B65H 75/08; B65H 75/30; B65H 75/425; B65H 2701/1922
See application file for complete search history.

(56) References Cited

U.S. PATENT DOCUMENTS

| | | | | |
|---|---|---|---|---|
| 1,297,067 A | * | 3/1919 | Blossom | B60J 7/085 296/98 |
| 2,976,082 A | * | 3/1961 | Dahlman | B60J 7/085 296/98 |
| 4,302,043 A | * | 11/1981 | Dimmer | B60J 7/085 135/115 |
| 4,505,512 A | * | 3/1985 | Schmeichel | B60J 7/085 135/119 |
| 4,659,134 A | * | 4/1987 | Johnson | B60J 7/085 160/245 |
| 4,673,208 A | * | 6/1987 | Tsukamoto | B60J 7/085 160/243 |
| 4,691,957 A | * | 9/1987 | Ellingson | B60J 7/085 135/903 |

(Continued)

FOREIGN PATENT DOCUMENTS

| | | | | |
|---|---|---|---|---|
| DE | 102012023610 A1 | * | 6/2014 | ............ B60J 7/085 |
| WO | WO-2017021807 A1 | * | 7/2018 | ............ B60H 75/30 |

*Primary Examiner* — Jason S Morrow
(74) *Attorney, Agent, or Firm* — McKee, Voorhees & Sease, PLC

(57) ABSTRACT

A tarp deploying apparatus for use on a trailer includes a fiberglass tarp roller. The fiberglass tarp roller is constructed from two fiberglass tubes. A splined joint is used to join the two tubes together. Each end of the tarp roller also includes a female socket with grooves to engage splines on a motor shaft that drives the tarp roller or to connect the roller tube to a universal joint. A pin or bolt may also be used at the splined joint to securely hold the tarp roller together without the need for a welding operation.

11 Claims, 4 Drawing Sheets

(56) References Cited

U.S. PATENT DOCUMENTS

| | | | | |
|---|---|---|---|---|
| 5,002,328 A * | 3/1991 | Michel | B60J 7/085 | 296/98 |
| 5,180,203 A * | 1/1993 | Goudy | B60J 7/085 | 296/100.15 |
| 6,206,449 B1 | 3/2001 | Searfoss | | |
| 6,273,490 B1 * | 8/2001 | Haddad, Jr. | B60J 7/085 | 160/52 |
| 6,305,638 B1 * | 10/2001 | Rodriguez | B65H 75/08 | 242/530.4 |
| 6,322,041 B1 * | 11/2001 | Schmeichel | B60J 7/085 | 248/646 |
| 6,478,361 B1 * | 11/2002 | Wood | B60J 7/104 | 296/98 |
| 6,513,856 B1 * | 2/2003 | Swanson | B60J 7/085 | 296/100.15 |
| 6,527,331 B2 * | 3/2003 | Searfoss | B60J 7/085 | 296/100.18 |
| 6,595,594 B2 * | 7/2003 | Royer | B60J 7/085 | 296/98 |
| 6,641,199 B1 * | 11/2003 | Hicks | B60J 7/085 | 296/100.18 |
| 6,783,168 B2 * | 8/2004 | Searfoss | B60J 7/085 | 296/100.11 |
| 6,805,395 B2 * | 10/2004 | Royer | B60J 7/085 | 24/714 |
| 6,979,043 B2 * | 12/2005 | Leischner | B25B 13/48 | 296/98 |
| 7,032,950 B2 * | 4/2006 | Eggers | B60J 7/085 | 296/98 |
| 7,513,561 B2 * | 4/2009 | Royer | B60J 7/085 | 296/100.01 |
| 7,611,187 B1 * | 11/2009 | Rogers | B60J 7/085 | 296/183.2 |
| 7,726,720 B2 * | 6/2010 | Searfoss | B60J 7/085 | 296/100.01 |
| 8,056,955 B1 * | 11/2011 | Schmeichel | B60J 7/085 | 296/100.14 |
| 8,162,377 B2 * | 4/2012 | Miller | B60J 7/085 | 296/100.11 |
| 8,182,019 B1 * | 5/2012 | Johnson | B60J 7/085 | 296/98 |
| 8,226,150 B1 * | 7/2012 | Schmeichel | B60J 7/085 | 296/100.15 |
| 8,272,676 B2 | 9/2012 | Bremer | | |
| 8,496,283 B1 * | 7/2013 | Schmeichel | B60J 7/085 | 296/100.16 |
| 8,641,123 B1 * | 2/2014 | Royer | B60J 7/085 | 296/100.11 |
| 8,783,756 B2 * | 7/2014 | Schmeichel | B60J 7/085 | 296/100.14 |
| 8,931,823 B2 * | 1/2015 | Bremer | B60J 7/085 | 296/98 |
| 8,985,669 B2 * | 3/2015 | Schmeichel | B60J 7/085 | 296/98 |
| 8,998,287 B2 * | 4/2015 | Smith | B65D 90/66 | 296/100.18 |
| 9,150,086 B1 * | 10/2015 | Royer | B60J 7/085 | |
| 2010/0230994 A1 * | 9/2010 | Royer | B60J 7/085 | 296/100.16 |
| 2010/0283285 A1 * | 11/2010 | Cramaro | B60J 7/085 | 296/98 |

* cited by examiner

US 10,131,214 B2

FIBERGLASS ROLLER FOR TARP DEPLOYING DEVICE

CROSS-REFERENCE TO RELATED APPLICATIONS

This application claims priority under 35 U.S.C. § 119 to provisional application Ser. No. 62/067,432 filed Oct. 22, 2014.

FIELD OF THE INVENTION

This invention relates generally to the field of tarp deploying devices.

BACKGROUND OF THE INVENTION

Trailers used to haul loose materials such as dirt, sand, gravel, or grain commonly have beds or tubs that have an open top with generally vertical front and rear walls and sloping sidewalls for retaining contents within the trailer. Therefore, if the trailer bed is not covered as the trailer is pulled over the road, the loose contents may be blown and scattered out of the open top of the trailer bed. Additionally, the contents of the trailer bed may be compromised by rain, or other contaminants. Accordingly, it is known to deploy tarps (i.e. tarpaulin) across the open top space of the trailer beds to cover the contents of the trailer beds.

Several mechanisms have been devised for deploying the tarps across the trailer bed. Many of these devices include radial arms that are rotatably mounted at the front and rear of the tub and have a roll of tarp disposed between them. The tarp is rolled upon and supported by a roller or spindle. As the radial arms rotate in one direction across the truck bed, the roll of tarp between the arms is unrolled off of the roller to cover the contents of the truck bed. When the arms are rotated back in the opposite direction, the tarp is taken back up upon the roller to uncover the trailer bed. Examples of such devices may be seen in Bremer, U.S. Pat. No. 8,272,676; Searfoss, U.S. Pat. No. 6,206,449; and in Michel, U.S. Pat. No. 5,002,328.

The tarp rollers have traditionally been made from steel or aluminum. However, such rollers are notorious for bending and permanently deforming over time, or as the result of an impact against the roller. Such bent rollers result in lost time when the trailer can be used in hauling material and in significant expense in replacing the damaged rollers. The metal tarp rollers also suffer from being heavy and subject to corrosion. The metal rollers are also prone to damage during shipping. The metal rollers also typically require welding as part of their manufacturing process. This can make manufacturing and replacing the rollers expensive and inconvenient.

BRIEF SUMMARY OF THE INVENTION

According to one embodiment, the present invention relates to a tarp deploying apparatus of the type having a rear radial arm pivotally attached proximate a rear wall and a front radial arm pivotally attached proximate a front wall, and having a tarp operably provided between free ends of the radial arms to selectively cover a space between the front and rear walls, wherein the tarp is rolled upon a fiberglass tarp roller. The fiberglass roller may be formed from a first fiberglass tube having a first outer end and a first joint end and a second fiberglass tube having a second outer end and a second joint end. The first joint end may include a female socket having grooves, and the second joint end may include a male spline wherein the male spline is matingly received within the female socket to join the first fiberglass tube to the second fiberglass tube.

DETAILED DESCRIPTION OF THE PREFERRED EMBODIMENT

Figure 1:
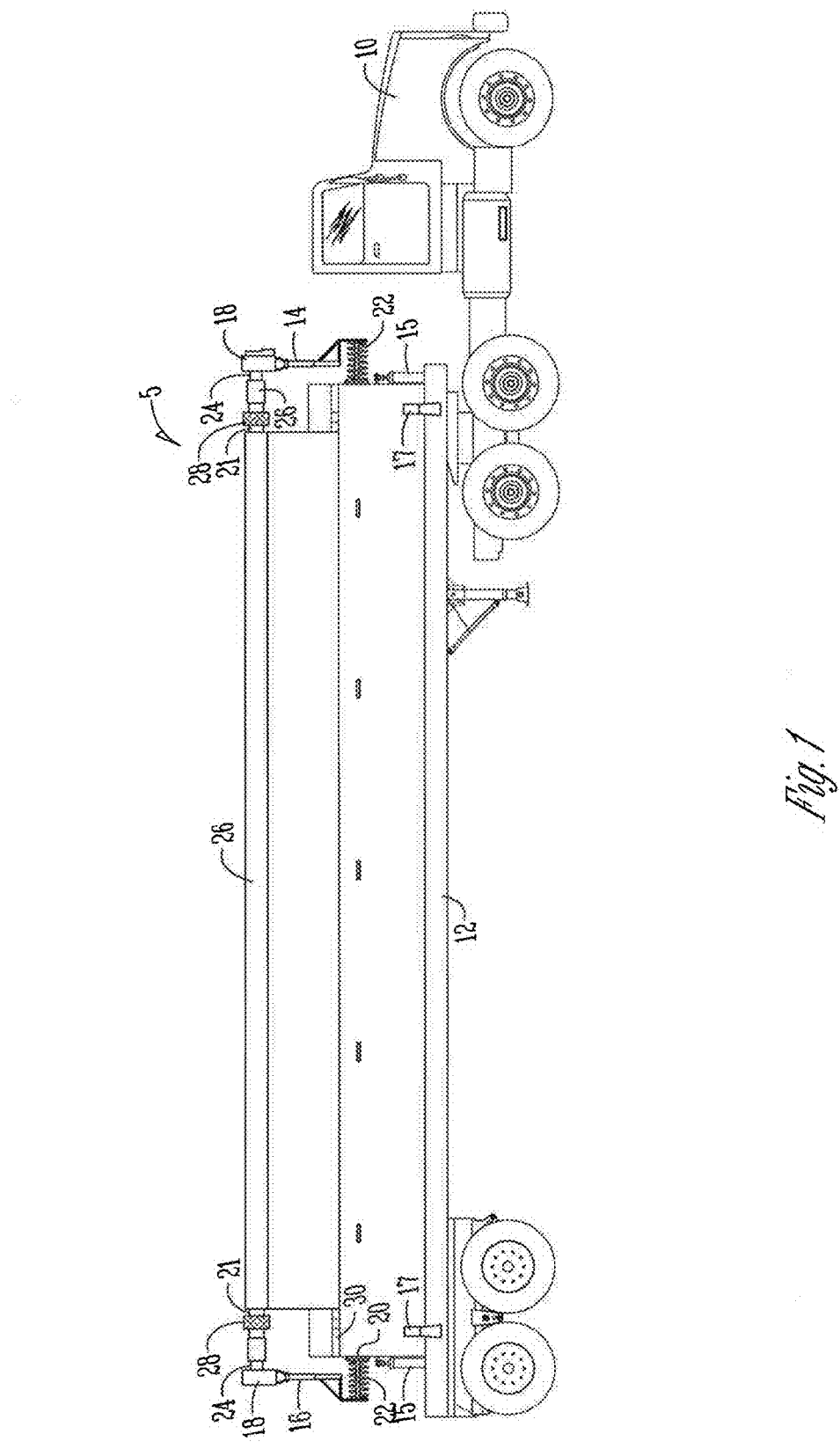
FIG. 1 is a side elevation view of a truck and trailer with a tarp deploying apparatus according to one embodiment of the present invention wherein the tarp is partial deployed about mid way between the open and closed positions.

FIG. 1 shows a truck 10 with an attached trailer 12. A tarp deploying apparatus 5 according to one embodiment of the present invention is provided on the trailer 12. The trailer 12 shown in FIG. 1 is a side-dump trailer that includes a tub 13 that can carry a load, such as sand, dirt, gravel, grain, or the like and dump the load to either side. The dumping action is accomplished by extending hydraulics 15 at each end of the tub 13 and selectively restraining or allowing the tub to pivot about releasable pivot connections 17. A tarp 26 is provided to cover a load within the tub 13. The tarp should be a flexible durable material, and may be reinforced by straps of material such as the type used in making automobile seat belts. The tarp 26 may be affixed along one side of the tub 13. In the embodiments shown in the drawings, the tarp is affixed on the right hand side (passenger side) near the top of the tub 13. Therefore when the tarp 26 is rolled up it is on the right hand side of the tub 13. When it is deployed to cover the load, a free end of the tarp 26 is stretched across to the left hand (driver) side. It should be appreciated that the tarp deploying apparatus 5 could be mounted in the opposite configuration such that it stores in the open position on the driver side. It should further be appreciated that the tarp deploying apparatus 5 may be advantageously used on other types of trailers and indeed other non-mobile structures that require selective covering and uncovering by a tarp.

The tarp deploying apparatus 5 includes a front radial arm 14 and a rear radial arm 16 that are pivotally connected to the front and rear of the tub 13 respectively. An extension, such as a housing 18 is provided at a free end of each of the radial arms 14, 16. The housings 18 are pivotally attached to the free ends of the radial arms 14, 16. A lower end of the rear radial arm 16 is pivotally attached to the rear of the tub 13. Mounting bases 20 are attached at the front and rear of the tub 13 to provide a location for mounting the radial arms 14 and 16. A helical torsion spring 22 provides a biasing force against the rear radial arm 16 that tends to urge the radial arm 16 towards the driver's side of the trailer 12 towards a deployed position. Other biasing means than a helical torsion spring might be used. For example, a spiral torsion spring or other known biasing mechanism.

A rotatable spindle 24 extends from each of the housings 18 to engage a tarp roller 21 that acts as a spool for a tarp 26 that is wrapped around the tarp roller 21. The tarp roller 21 spans between the spindles 24 at the top of the radial arms 14, 16. A motor 34 may be attached to one or both of the housings 18 to provide a rotational drive to the spindle 24 and thereby to the tarp roller 21 on which the tarp 26 is wound.

Figure 6:
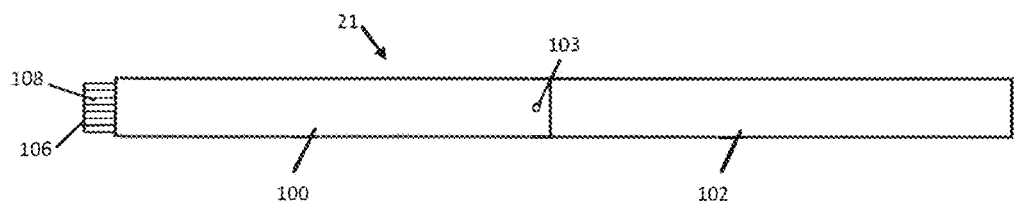
FIG. 6 is an elevation view of a fiberglass tarp roller according to one embodiment of the present invention.
Figure 7:
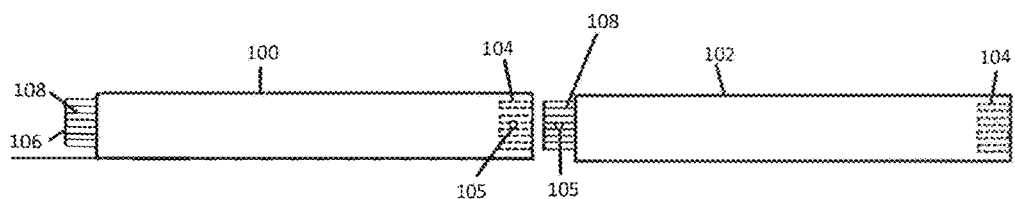
FIG. 7 shows the two tubes that form the fiberglass roller of FIG. 6.

FIG. 6 shows a tarp roller 21 according to one embodiment of the present invention. The tarp roller 21 is formed from two fiberglass tubes 100 and 102. Tube 100 has a female socket with grooves 104 (not shown in FIG. 6, see FIG. 7) at its inner end. The socket in tube 100 receives a male projection 106 with splines 108 that engage the grooves 104 of the female socket. In this fashion the two tubes are secured to each other in a fixed position relative to each other. A pin 103, bolt, or other mechanical fastener may also be provided at the joint between tubes 100 and 102 for prevent the tubes from coming apart from each other. Openings 105 in the tubes 100 and 102 are aligned when the splines 108 are received in the grooves 104 to receive the pin 103. If the pin or bolt would happen to break or become dislodged, the splined connection assures that the tarp roller 21 remains functional. The outer ends of each of the tubes 100 and 102 are also formed with female sockets with grooves 104. The sockets and grooves 104 allow the outer ends of the tubes 100 and 102 to engage the splines 108. The female socket 104 in tube 102 is adapted to receive the splined output shaft 35 of the motor 34 (See FIG. 8).

The two tubes 100 and 102 can be shipped disassembled from each other to make them easier to handle. Each of the tubes 100 and 102 can be created by machining or otherwise removing material from a stock fiberglass tube.

Rollers 28 are provided on the tarp roller 21 between the housing 18 and the tarp 26. Preferably the rollers 28 will be made if a relatively soft material and include grooved treads to provide some traction as the rollers 28 engage a lip 30 on the sides of the tub 13 as will be explained in more detail below.

FIGS. 2, 3, 4 and 5 are rear elevation views of tub 13 with a tarp deploying apparatus 5. These Figures show how the radial arm 16 pivots across the rear of the tub 13 to deploy the tarp 26, and further how the housing 18 pivots relative to the radial arm 16 to tuck the tarp 26 and roller 28 under the lip 30.

Figure 2:
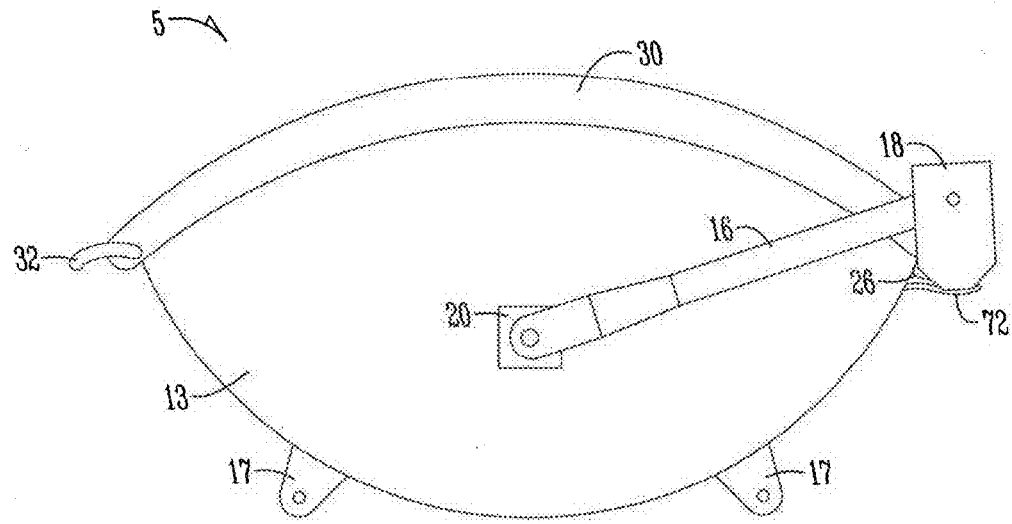
FIG. 2 is a rear elevation view of the tarp deploying apparatus of FIG. 1 on a trailer tub in an open position.

In FIG. 2, the tarp 26 is in an undeployed configuration, with the housing 18 pivoted in a clockwise direction relative to the radial arm 16 to tuck the tarp roller 21 and tarp 26 under the lip 30 of the passenger side of the tub 13. In this configuration the force of the torsion spring 22 (not visible in FIG. 2) acting on radial arm 16 urges the housing 18 upward and to the left, which presses the tarp rolled on the tarp roller and the roller 28 into the underside of the lip 30 (see FIG. 6), which restrains the assembly in the storage position of FIG. 2. It should be understood that the lip 30 may extend beyond the surface of the side of the tub 13, or may be coterminous with the outer surface of the sidewall of the tub 13.

Figure 3:
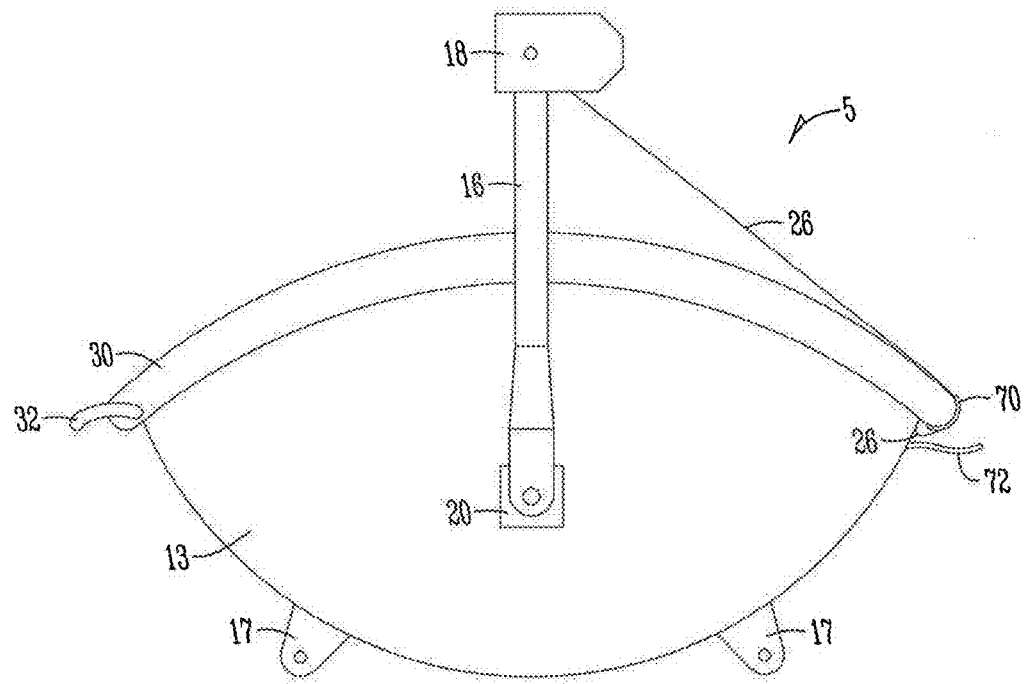
FIG. 3 is a rear elevation view of the tarp deploying apparatus of FIG. 2 in a partially deployed position.
Figure 8:
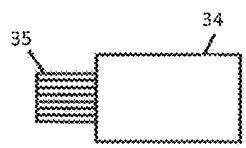
FIG. 8 is a side elevation view of a motor used in association with the present invention.

In FIG. 3, the radial arm 16 has rotated about halfway towards the driver's side of tub 13 to the position also shown in FIG. 1 such that the tarp 26 is partially deployed. In order to get out of the tucked position of FIGS. 2 and 6, it was necessary for the housing 18 to rotate counter clockwise relative to the radial arm 16 in order for the tarp 26 on the tarp roller 21 to clear the lip 30. This is effected by rotating the spindle 24 with the motor 34, which in turn rotates the tarp roller 21. This creates slack in the tarp 26. Furthermore, the roller 28, in close contact with the traction mat 70 pulls the assembly out and around the lip 30 as it rotates. As described in more detail below related to FIG. 1, the roller 28 is provided with a traction enhancing tread to increase the coefficient of friction between the roller 28 and the lip 30 and/or the mat 70. A structure for the connection between the front radial arm 14 and the housing 18 is shown in FIG. 8. The connection between the rear radial arm 16 and the housing 18 is similar, except that typically the housing 18 for the rear radial arm 16 typically will not include a motor. This structure biases the housing 18 towards the tucked position, but not quite to the fully tucked storage position. The structure also includes a spring oriented in the opposite direction to help get housing 18 out of the fully tucked position. Once the tarp 26 and the tarp roller 21 clear the lip 30, the force of the helical torsion spring 22 acting against the radial arm 16 (and the front spring 22 acting against the front radial arm 14) moves the assembly to the position of FIG. 3.

Figure 4:
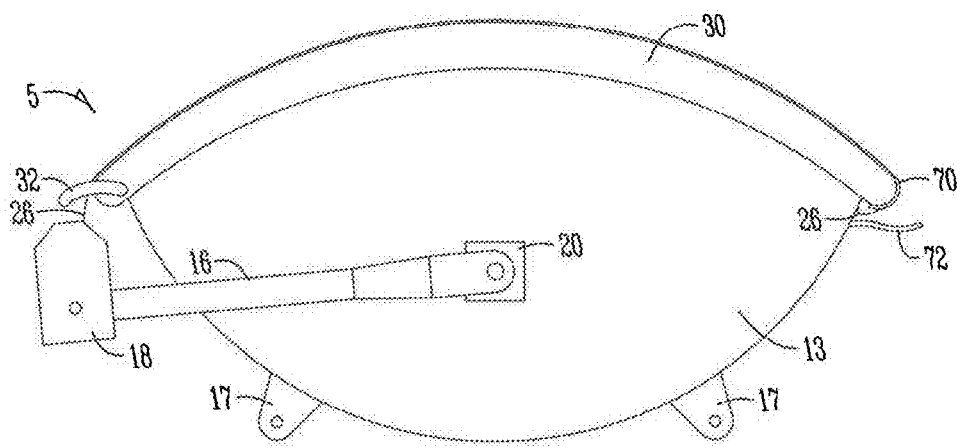
FIG. 4 is a rear elevation view of the tarp deploying apparatus of FIG. 3 in a closed position with the tarp fully unrolled.

In FIG. 4, the radial arm 16 has been rotated to the full extend allowed by the tarp 26, which is fully unrolled from the tarp roller 21. Movement from the intermediate position of FIG. 3 to the position of FIG. 4 is implemented primarily by the force of the springs 22 acting on the radial arms 16 (and 14), which keeps the tarp 26 relatively taunt and tends to unroll it from the tarp roller 21. The motor 34 (see FIG. 1) also continues to rotate the tarp roller 21.

Figure 5:
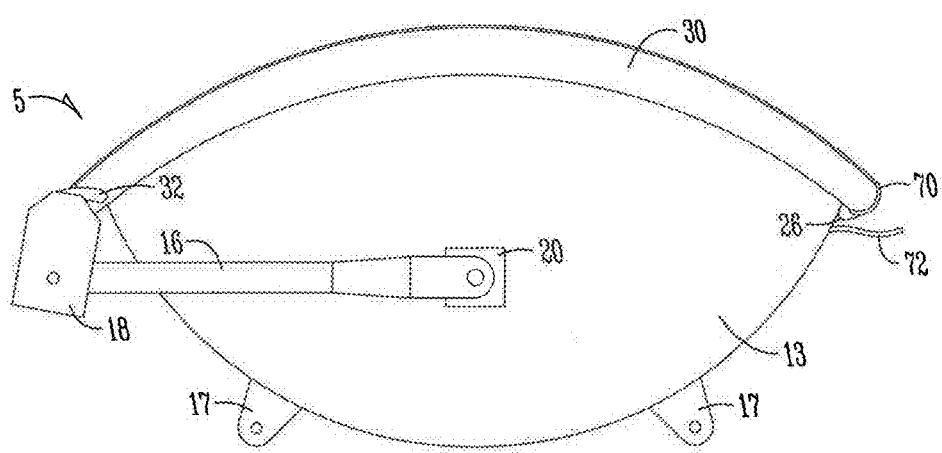
FIG. 5 is a rear elevation view of the tarp deploying apparatus of FIG. 4 in a closed position with the tarp roll stored against the side of the tub.

To move from the position of FIG. 4 to the fully deployed position of FIG. 5, the motor 34 continues to rotate the tarp roller 21 (in the counterclockwise position as viewed in FIG. 5, if the tarp roller 21 was visible), which causes the housing 18 to climb upward against the tension in the tarp 26. In FIG. 5 the radial arm 16 has rotated to a fully deployed position such that the tarp 26 is completely covering the open top of the tub 13. The housing 18 is again rotated slightly in a clockwise direction relative to the end of the radial arm 16 in order to tuck the roller 28 beneath the lip 30 on the driver's side of the tub 13. The roller 28 acting against the lip 30 provides the necessary force to rotate the housing 18 to the cocked fully deployed position of FIG. 5. The catch 32 extending from the lip 30 acts to catch the tarp roller 21 and retain it in the fully deployed position. This is especially important when travelling because air moving under the tarp 26 tends to create a lifting force that could lift the tarp 26 out of position if the catch 32 did not restrain the tarp roller 21.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention.

What is claimed is:

1. In a tarp deploying apparatus of the type having a rear radial arm pivotally attached proximate a rear wall and a front radial arm pivotally attached proximate a front wall, and having a tarp operably provided between free ends of the radial arms to selectively cover a space between the front and rear walls, the improvement comprising:

a self-supporting fiberglass tarp roller extending substantially between the rear and front radial arms upon which the tarp is rolled, the fiberglass tarp roller comprising:

a first fiberglass tube having a first outer end and a first joint end;

a second fiberglass tube having a second outer end and a second joint end;

wherein the first joint end includes a female socket having grooves;

wherein the second joint end includes a male spline; and wherein the male spline is matingly received within the female socket to co-axially join the first fiberglass tube to the second fiberglass tube at a joint that is covered by the tarp when the tarp is rolled upon the roller.

2. The improvement of claim 1, further comprising a mechanical connection member through the first joint end and the second joint end that secures the first fiberglass tube joined to the second fiberglass tube.

3. The improvement of claim 1, wherein the first outer end has a first female socket with grooves for engagement with a drive spindle of a motor.

4. The improvement of claim 1 wherein the fiberglass roller does not surround a separate inner core.

5. The improvement of claim 1 wherein the fiberglass roller is free from an internal metallic support extending there through.

6. In combination with a particulate material trailer having an open top, a tarp movable between open and closed position relative to the top of the trailer, and a tarp deployment system for rolling the tarp between the open and closed positions, the tarp deployment system comprising:

an elongated fiberglass roller extending longitudinally relative to the trailer and upon which the tarp is rolled and supported; and wherein the roller has two segments joined together coaxially at a joint, wherein a first one of the two segments has a female socket with grooves and a second one of the two segments has male projection with splines, and wherein the splines of the male projection are matingly engaged with the grooves within the female socket, and wherein the joint is covered by the tarp rolled on the roller when the tarp is in the open position.

7. The combination of claim 6 wherein the segments are pinned together.

8. The combination of claim 6 wherein the roller is free of a separate interior member extending the length of the roller.

9. The combination of claim 6 wherein the roller does not encase an independent core.

10. The combination of claim 6 wherein the roller is self-supporting.

11. The combination of claim 6 wherein the roller is supported only at its opposite ends.

* * * * *